United States Patent [19]

Smith et al.

[11] Patent Number: 5,450,925
[45] Date of Patent: Sep. 19, 1995

[54] LUBRICATION SYSTEM FOR A RECIPROCATING POWER TOOL

[75] Inventors: Kenneth Smith, Bayboro; Manfred Staebler, New Bern, both of N.C.

[73] Assignee: S-B Power Tool Company, Chicago, Ill.

[21] Appl. No.: 222,890

[22] Filed: Apr. 5, 1994

[51] Int. Cl.⁶ .................. F16C 17/12; B23D 49/02
[52] U.S. Cl. .................................... 184/5; 184/6.14; 184/6.17; 30/392; 30/393; 30/394; 30/515; 74/60; 417/555.1
[58] Field of Search ............... 184/5, 6.14, 6.17, 9, 184/24, 100; 30/123.3, 392, 393, 394, 515, ; 74/60; 417/555.1; 384/13

[56] References Cited

U.S. PATENT DOCUMENTS

| | | | |
|---|---|---|---|
| 1,221,921 | 4/1917 | Sundh | 74/60 |
| 2,139,189 | 12/1938 | Hall | 74/60 |
| 2,827,792 | 3/1958 | Hopkins | 184/6.17 |
| 2,877,653 | 3/1959 | Masnik et al. | 184/6.17 |
| 4,114,270 | 9/1978 | Jansen—Herfeld et al. | 30/394 |
| 4,385,443 | 5/1983 | O'Banion | 30/393 |
| 5,094,145 | 3/1992 | Wakabayashi et al. | 184/6.17 |
| 5,380,167 | 1/1995 | Burkett et al. | 74/60 |

FOREIGN PATENT DOCUMENTS 1-39114  5/1990  Japan .................... 30/392

*Primary Examiner*—Edward K. Look
*Assistant Examiner*—Christopher Verdier
*Attorney, Agent, or Firm*—Jones, Day, Reavis & Pogue

[57] ABSTRACT

The drive mechanism for imparting reciprocating movement to the tool plunger includes first and second drive members. The first drive member is mounted on an eccentric formation which is in turn mounted on a drive shaft thereby to impart a wobbling movement to the first drive member. The second drive member is in the form of a piston mounted for reciprocating movement within a bore formed in the first drive member. The second drive member is pivotally connected to the plunger. The second drive member has a helical groove in its exterior surface. A lubricant is forced along the groove in part due to the reciprocating movement of the second drive member in the bore of the first drive member.

6 Claims, 1 Drawing Sheet

LUBRICATION SYSTEM FOR A RECIPROCATING POWER TOOL

BACKGROUND OF THE INVENTION

The present invention relates to a power tool having a reciprocating, and sometimes oscillating, saw blade holder. More particularly, the invention relates to a self-lubrication system forming part of the drive mechanism which imparts reciprocating movement to the saw blade holder.

Reciprocating power saws of the type under consideration are normally electrically powered and employ a mechanical drive system to convert rotary movement of the motor shaft to reciprocating movement of the saw blade holder. Needless to say, it is necessary that these fast-moving mechanical parts be properly lubricated. (For prior art of general interest, attention is invited to U.S. Pat. Nos. 2,139,189, 2,258,138 and 3,461,732.)

Power tools of the type under discussion are portable and consequently must be of light-weight and compact construction to the extent possible. Thus, space and weight requirements dictate that a separate pump cannot be employed to provide the moving parts with a suitable lubricant. (See U.S. Pat. Nos. 2,184,461 and 3,938,622 for a showing of a separate lubrication pump in a chain saw.) Further, the immersion of all of the moving parts in a body of oil or grease is not feasible as expensive seals, particularly in the area of the reciprocating tool holder, would be needed to prevent leakage of the lubricant to the exterior of the tool housing. Accordingly, there is a long-felt need in the art for an efficient, light-weight and compact lubrication system for the drive mechanism of a reciprocating power tool.

SUMMARY AND OBJECTS OF THE INVENTION

The present invention provides a self-lubricating drive mechanism in the sense that advantage is taken of the necessary movements of the various parts of the drive mechanism to transfer the lubricant throughout the drive mechanism.

A primary object of the present invention is the provision of a new and improved self-lubricating drive system for a reciprocating power tool.

A further object of the present invention is the provision of a self-lubricating drive mechanism which does not require separate components, such as a pump and conduits.

A still further object of the present invention is the provision of a self-lubricating drive mechanism which is compact, efficient, lightweight and does not require the use of separate or additional parts.

These and other advantages and objects of the present invention will become apparent from a review of the following specification and drawing disclosing a preferred embodiment of the invention.

DESCRIPTION OF THE DRAWING

The single drawing is a longitudinal section of a reciprocating power tool embodying the drive and lubrication system of the present invention.

DESCRIPTION OF THE PREFERRED EMBODIMENT

Figure 1:
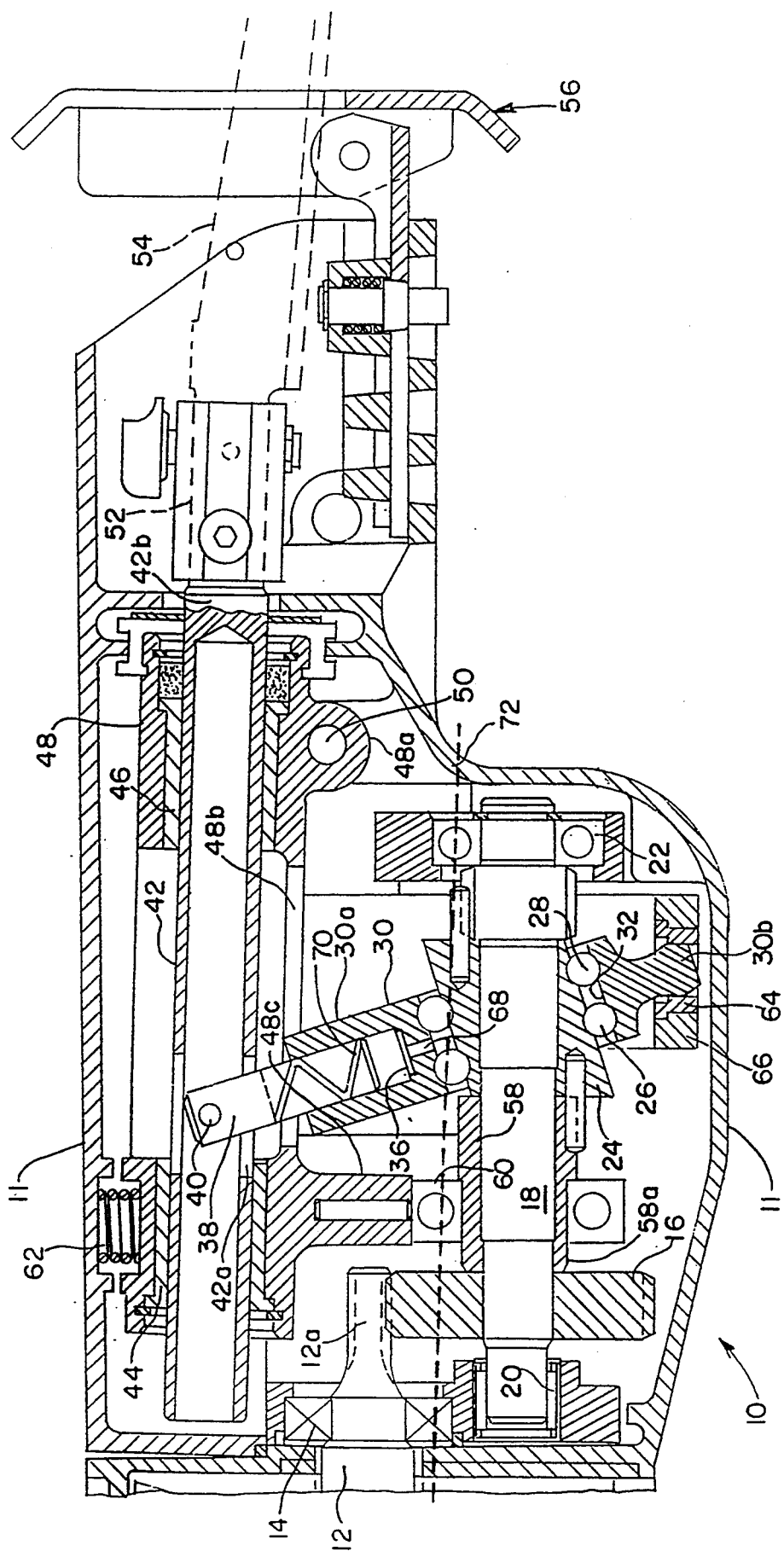

Referring to the drawing, a portion of a reciprocating power saw, generally designated 10, includes a housing or casing 11. The tool includes an electric motor (not shown) having an output shaft 12 mounted in a bearing structure 14. The output shaft 12 terminates in a pinion formation 12a which meshes with teeth on a gear 16. This gear is mounted on a shaft 18 for rotation therewith. The shaft 18 has its opposite ends mounted for rotation in bearing assemblies 20 and 22. Thus, it is apparent that energization of the motor will impart rotation to the shaft 18 through a reduction gear assembly constituted by the pinion 12a and the gear 16.

The shaft 18 mounts an eccentric cylindrical formation 24 for rotation therewith. This eccentric formation includes parallel, annular races for receiving first and second sets of ball bearings 26 and 28.

A first drive member 30 includes an opening defined by a cylindrical wall 32. This cylindrical wall includes parallel annular races for receiving the sets of ball bearing members 26 and 28. Thus, the sets of ball bearings serve to mount the drive member 30 on the shaft 18. It will be apparent that upon rotation of the shaft 18, a wobbling movement will be imparted to the drive member 30 by reason of the eccentric formation 24.

The drive member 30 includes a first extension 30a having a blind opening or bore 36 slidably receiving a second drive member 38 which is cylindrical in the nature of a piston. The drive member 38 includes a diametrically disposed opening receiving a pin 40, opposite ends of which are received in apertures in the wall of a hollow cylindrical plunger 42. The plunger 42 includes a slot 42a which freely receives the cylindrical drive member 38.

The cylindrical plunger is mounted for reciprocal sliding movement in first and second annular bearings 44 and 46. These bearings are mounted in a sleeve 48. This sleeve has an integral extension 48a having an aperture for receiving a pin 50, opposite ends of which are supported by the housing 11. Thus, it will be understood that the sleeve 48 is mounted for pivoting movement about the axis of the pin 50. The sleeve includes an opening 48b to accommodate movement of the drive members.

The plunger 42 includes a forward, integral solid formation 42b mounting a tool holder 52. This tool holder mounts a saw blade 54.

The tool 10 includes an adjustable guide shoe assembly, generally designated 56. This adjustable guide shoe mechanism is preferably of the type disclosed and claimed in application Ser. No. 08/200,384, filed Feb. 23, 1994, assigned to the assignee of the present invention.

It will be apparent that upon rotation of the shaft 18, reciprocating movement will be imparted to the plunger 42 and consequently to the saw blade 54. During this reciprocating movement of the plunger 42, the drive member 38 will slide in and out of the opening 36 in the drive member 30.

It will be noted that the shaft 18 mounts a second cylindrical member 58 having an eccentric portion 58a. This eccentric formation mounts an annular member 60 for rotation with the shaft 18.

The sleeve 48 includes an integral depending formation 48c arranged to engage the eccentrically mounted member 60. A coil spring 62 has its opposite ends received within recesses in the interior wall of the casing 11 and in the sleeve 48. Thus, the spring 62 will tend to urge the formation 48c into engagement with the eccentric 60 for pivoting or rocking the sleeve 48 about the axis of the pin 50. Accordingly, when the formation 48c is in engagement with the cylindrical member 60 under the influence of the spring 62, an orbital movement will be imparted to the saw blade 54. Means (not shown) may be provided to maintain the formation 48c out of engagement with the eccentrically mounted member 60 if only reciprocating movement is desired.

It will be noted that the drive member 30 includes a second extension 30b shaped in the nature of a knob and movably received within an annular bearing 64 mounted in a counterweight assembly, a portion of which is illustrated and designated 66. This counterweight assembly need not be described in any detail herein as it forms no part of the present invention.

Turning now to the lubrication system, it will be noted that the drive member 30 is provided with a port 68 having one end in communication with the base of the bore 36. The other end of the port 68 is in communication with an annular space defined by the cylindrical wall 32 in the drive member 30 and the outer cylindrical wall of the eccentric formation 24. The cylindrical drive member 38 is provided with a helical groove 70 formed on the exterior thereof. One end of this helical groove extends to the inner end of the cylindrical drive member 38. The other end of the groove 70 extends to a portion of the drive member 38 which is always outside of the opening 36.

A suitable supply of a lubricant, such as grease, is contained within the lower portion of the tool housing 11. Preferably, the amount of grease will be such that it is maintained to the level indicated by the broken line 72.

Centrifugal forces, developed by rotation of the shaft 18 and eccentric formation 24, will force the lubricant through the bore 68 into the base of the cylindrical opening 36. Accordingly, a supply of the lubricant will be provided to the base of the opening 36. Further, during sliding movement of the cylindrical drive member 38 out of the cylindrical opening 36, a partial vacuum will be created which tends to draw the lubricant into the base of the cylindrical opening 36. When the cylindrical member 38 slides inwardly of the opening 36, the lubricant in the base of the latter will be forced into and along the helical groove 70 for lubricating the areas of contact between the exterior surface of the drive member 38 and the wall of the cylindrical opening 36.

Consequently, the present invention provides a self-lubricating system forming part of the drive mechanism which imparts reciprocating movement to the saw blade 54. The lubrication system takes advantage of the centrifugal forces generated by rotation of the eccentric 24. Further, the system takes advantage of the piston-like action of the drive member 38 for forcing the lubricant along the helical groove 70.

It will be understood that the present invention is not to be limited to the specific preferred embodiment disclosed herein. The present invention embodies all modifications and variations within the scope of the following claims.

We claim:

1. A drive mechanism for a reciprocating power tool comprising:
   (a) a housing, a portion of which is adapted to contain a supply of lubricant;
   (b) a drive shaft having at least a portion thereof in said housing portion so as to be immersed in the lubricant;
   (c) a drive assembly including first and second drive members in slidable engagement with each other, one of said drive members including an opening and the other of said drive members including a formation slidably interfitted within said opening;
   (d) an output member mounted for reciprocating movement and pivotally connected to said drive assembly;
   (e) eccentric means mounting said drive assembly on said shaft portion for oscillating said drive assembly and thereby causing relative sliding movement between said first and second drive members in response to rotation of said shaft and as a consequence of the pivotal connection between said output member and said drive assembly; and
   (f) said drive assembly including first passageway means communicating said opening with the portion of the housing containing the lubricant, second passageway means in the vicinity of the sliding interfit and being further provided for communicating the areas of sliding engagement between said opening and said formation with said first passageway means, whereby relative sliding movement between said first and second drive members tends to draw the lubricant into said opening for lubricating the areas of engagement between said opening and said formation.

2. A drive mechanism for a reciprocating power tool comprising:
   (a) a housing, a portion of which is adapted to contain a supply of lubricant;
   (b) a drive shaft having at least a portion thereof in said housing portion so as to be immersed in the lubricant;
   (c) a first drive member having an opening;
   (d) eccentric means mounting said first drive member on said drive shaft portion for imparting a wobble movement to said first drive member in response to rotation of said drive shaft;
   (e) a second drive member having a first portion slidably received within said opening of the first drive member;
   (f) an output member and means mounting the same for reciprocating movement along an axis in spaced, substantially parallel relationship with the axis of said drive shaft;
   (g) pivot means connecting a second portion of said second drive member with said output member such that the wobbling movement of said first drive member imparts reciprocal movement to said output member and thereby causes sliding movement of said second drive member into and out of said opening; and
   (h) said first and second drive members including respective communicating passageway means for communicating the areas of sliding engagement between said first and second drive members with the lubricant in said housing portion.

3. A drive mechanism for a reciprocating power tool comprising:
   (a) a housing, a portion of which is adapted to contain a supply of lubricant;
   (b) a drive shaft having at least a portion thereof in said housing portion go as to be immersed in the lubricant;
   (c) an annular eccentric formation on said drive shaft for rotation therewith;

(d) a drive assembly including a wobble plate and a drive member;

(e) said wobble plate having a first annular opening defined by a cylindrical wall and a second opening communicating with the exterior of the wobble plate;

(f) bearing means engaged with said eccentric formation and said annular wall thereby mounting said wobble plate for wobbling movement in response to rotation of said shaft, said bearing means also defining a substantially continuous annular space between said eccentric formation and said cylindrical wall;

(g) said wobble plate having a port communicating said annular space with said second opening;

(h) said drive member having a first portion thereof slidably interfitted within said second opening in the wobble plate;

(i) an output member and means slidably mounting the same for reciprocating movement along an axis in substantial parallel spaced relationship with the axis of said drive shaft; and (j) pivot means connecting a second portion of said drive member with said output member such that said drive member reciprocates in said second opening in response to rotation of said drive shaft for drawing the lubricant into said second opening through said annular space and said port; and (k) passageway means in the vicinity of said sliding interfit communicating with said second opening to facilitate the delivery of lubricant to the areas of sliding engagement between said second opening and the first portion of said drive member.

4. The drive mechanism according to claim 3 wherein said passageway means is defined by an external groove on the first portion of said drive member in communication with the space defined by said second opening in the wobble plate and the first portion of said drive member.

5. The drive mechanism according to claim 3 further defined by:

(a) said second opening in the wobble plate being of cylindrical shape with the inner end thereof communicating with said port; and (b) said drive member being in the form of a cylindrical piston having a portion thereof received within said second opening, said piston having a helical groove in the exterior surface of said portion thereof and thereby defining said passageway means, one end of said groove extending to the end of said piston which is received within said second opening in the wobble plate thereby to facilitate the delivery of lubricant to the areas of sliding engagement between said piston and said second opening.

6. A drive mechanism for a reciprocating power tool comprising:

(a) a housing, a portion of which is adapted to contain a supply of lubricant;

(b) a drive shaft having at least a portion thereof in said housing portion so as to be immersed in the lubricant;

(c) a drive assembly including a first drive member having an opening;

(d) said drive assembly also including a second drive member having a first portion slidably received within said opening of the first drive member;

(e) eccentric means mounting said drive assembly on said drive shaft portion for imparting a wobble movement to said one drive assembly in response to rotation of said drive shaft;

(f) an output member and means mounting the same for reciprocating movement along an axis in spaced, substantially parallel relationship with the axis of said drive shaft;

(g) pivot means connecting said drive assembly with said output member such that the wobbling movement of said drive assembly imparts reciprocal movement to said output member and thereby causes sliding movement of said second drive member into and out of said opening in the first drive member; and (h) said drive assembly including first passageway means for communicating the areas of sliding engagement between said first and second drive members with said opening and second passageway means communicating said opening with the lubricant in said housing portion.

* * * * *